Patented Jan. 17, 1939

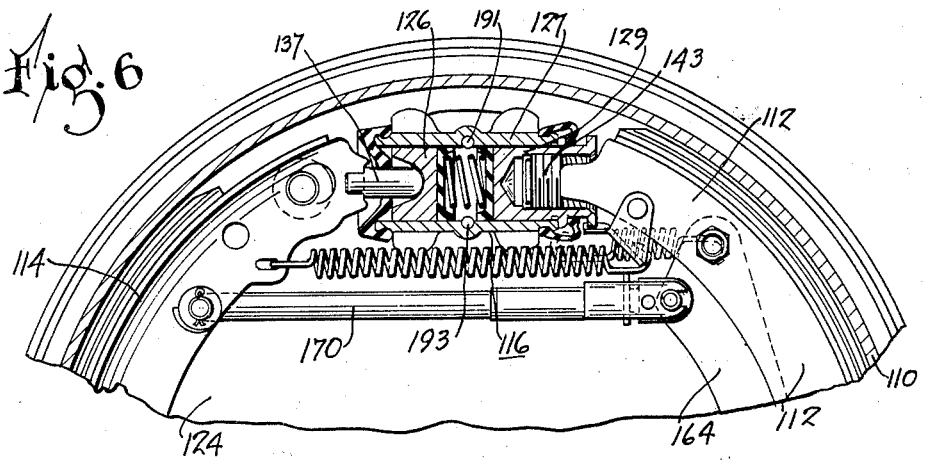
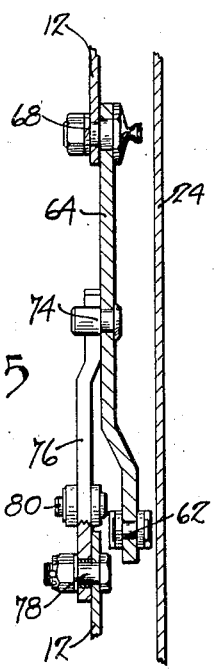
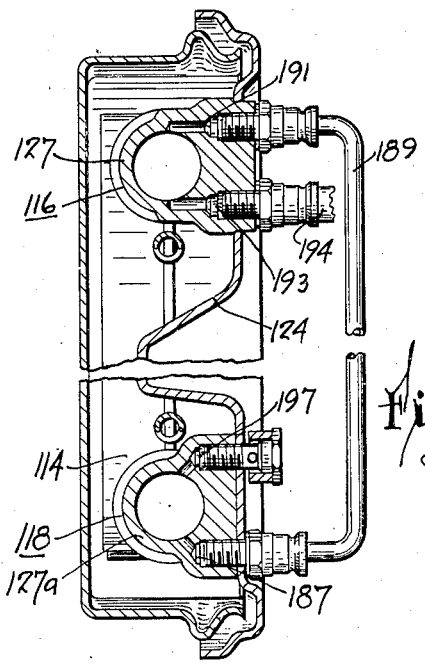

2,144,025

UNITED STATES PATENT OFFICE 2,144,025

BRAKE

Ludger E. La Brie, South Bend, Ind., assignor to Bendix Products Corporation, South Bend, Ind., a corporation of Indiana Application September 12, 1935, Serial No. 40,290

18 Claims. (Cl. 188—152)

This application relates to brakes and is illustrated by a brake of the internal expanding type in which a pair of individually shiftable shoes are arranged to be spread into contact with a revolving drum so that each shoe is selfenergized in both directions of rotation.

One of the objects of the invention is the provision of means in such a type of brake of applying pressure substantially equally to two points of each of the shoes of such a brake.

A further object of the invention is the provision in combination with a hydraulic cylinder for actuating the shoes of an internal expanding brake, of means whereby one of the shoes may anchor upon one end of the hydraulic cylinder in one direction of rotation and of a pivoted connection through which a piston in the cylinder may move the other shoe into contact with the drum.

A further object of the invention is the provision, in a brake of the character described in which two cylinders are used to actuate the brake, of improved means for supplying fluid under pressure to the cylinders and of improved means for bleeding the cylinders of air trapped therein.

One of the features of the brake disclosed is the provision of a pair of interconnected levers, both of which are pivoted on one of the shoes and both of which are connected by strut links with the other shoe.

A further feature of the invention is the arrangement of a strut connecting a piston of one of the cylinders with the adjacent end of the shoe actuated thereby.

A further feature of the invention is the arrangement of the conduits connecting the cylinders with each other and with the source of liquid pressure and of the bleed openings for the cylinders.

Further features and objects of the invention will be apparent after a reading of the subjoined specification and claims and after a consideration of the accompanying drawings in which:

Figure 5 is a fragmentary sectional view taken substantially on the line 5—5 of Figure 1;

Figure 6 is a fragmentary sectional view corresponding substantially to a portion of Figure 1 but showing a slightly modified form of construction; and Figure 7 is a sectional view with parts broken away showing the same brake as that shown in Figure 6 taken at right angles thereto.

Figure 1:
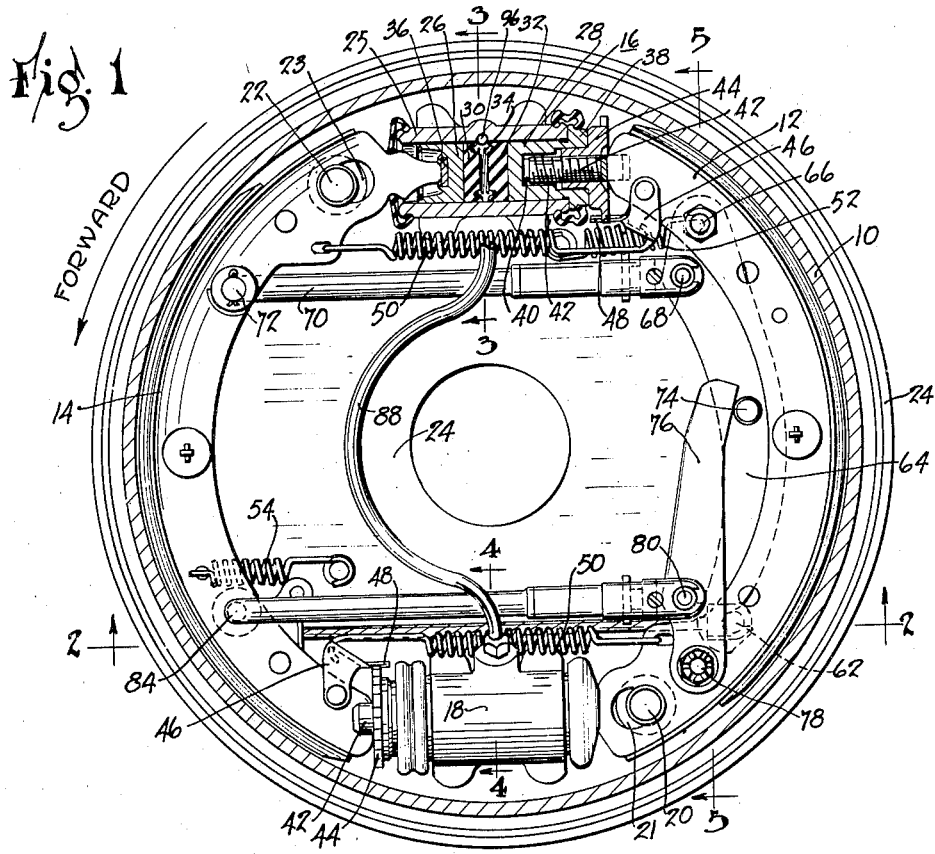
Figure 1 is a view partly in section taken substantially vertically through one of the brakes.

Referring in detail to the drawings, it may be seen that I have shown in Figure 1 a brake comprising a drum 10 and shoes 12 and 14. Interposed between the opposite ends of the shoes 12 and 14 and secured to the backing plate 24, are wheel brake actuating motors 16 and 18 on which the shoes 12 and 14 are arranged to anchor in the counterclockwise direction of rotation of the drum as will be subsequently explained. In the clockwise direction of rotation of the drum the shoe 12 anchors upon the anchor 20 and the shoe 14 anchors upon the anchor 22. The anchors 20 and 22 are also secured to the backing plate 24 and extend through pear shaped openings 21 and 23 formed in the shoes 12 and 14 respectively.

The wheel motors 16 and 18 are of the same construction and the construction thereof is shown best in the upper part of Figure 1. Therein it may be seen that the wheel motor 16 comprises a cylinder 25 provided with pistons 26 and 28 provided with packing cups 30 and 32 between which there is interposed a spring 34. The piston 26 is provided with a wear plate 36 on which the adjacent end of the shoe 14 bears. The piston 28 is provided with an annular shoulder 38 which normally bears against the end of the cylinder 25 and which, when the brake is being operated in a counterclockwise direction transmits the braking torque to the cylinder, thus causing the cylinder to act as an anchor for the brake. The piston 28 is also provided with a recess 40 in which one end of a screw 42 extends. The screw 42 is provided with a nut 44 which is threaded thereon and which is arranged to contact with the shouldered member 38. The opposite end of the screw 42 to that which extends in the recess 40 is slotted to embrace the adjacent end of the shoe 12 and is arranged to take thrust from said shoe and to transmit applying force thereto. By reason of the slot the shoe is positioned transversely of the drum and the screw 42 is prevented from rotating. By turning the nut 44 on the screw 42 adjustment for lining wear may be had by increasing or decreasing the length of the connection between the piston 28 and the shoe 12.

Adjacent to the nuts 44 there are pivoted upon the shoes 12 and 14 a pair of stamped levers 46 having locking projections 48 arranged to contact with the notched circumference of the nuts 44 and hold these nuts in adjusted position. Connected to the levers 46 are springs 50 which have their opposite ends connected to the shoes 14 and 12 respectively and serve to maintain the projections 48 in contact with their associated nuts. The action of the levers 46 and the spring 50 also serves to position the associated ends of the shoes 12 and 14 when the brake is released, insuring that these ends of the shoes will be withdrawn with contact with the rotating drum. It is understood that the pear-shaped openings 21 and 23 in the shoes 12 and 14 position the other ends of the shoes 12 and 14 by their co-operation of the anchors 20 and 22. Springs 52 and 54 each connected at one of their ends to the backing plate and at their other ends with the shoes 12 and 14 respectively serve to insure that during normal forward braking (that is the direction of drum rotation shown by the arrow in Figure 1), the anchoring ends of the shoes 12 and 14 remain anchored, the shoes contacting the screws 42, the nuts 44 contacting with the shouldered member 38, and these in turn contacting the ends of the cylinders 25.

Figure 2:
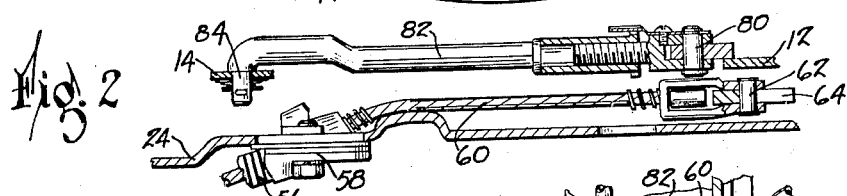
Figure 2 is a fragmentary sectional view taken substantially on the line 2—2 of Figure 1.
Figure 3:
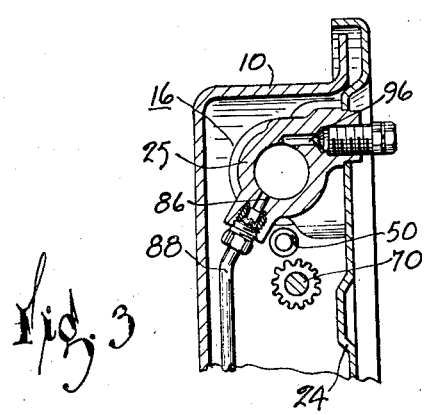
Figure 3 is a fragmentary sectional view taken substantially on the line 3—3 of Figure 1.
Figure 4:
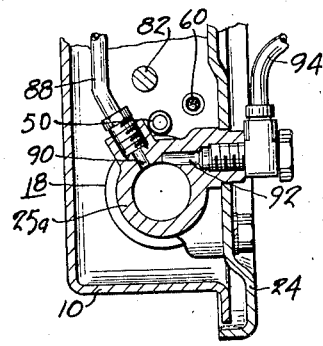
Figure 4 is a fragmentary sectional view taken substantially on the line 4—4 of Figure 1.

Provision is made for applying the shoes mechanically as well as hydraulically. As may be seen most clearly in Figure 2, a conduit 56 is secured to the backing plate 24 by a fitting such as 58. Extending through the conduit 56 and the fitting 58 is a cable 60 which is secured at its inner end pivotally as at 62 to the lower hooked end of a lever 64. The opposite end of the lever 64 (as is shown most clearly in Figure 1) is pivoted as at 66 on the shoe 12 and intermediate the ends of the lever there is pivotally connected as at 68 an adjustable strut link 70 having its opposite end pivotally connected to the shoe 14 as at 72. Between the pivots 62 and 68, the lever 64 is provided with a roller 74 which contacts with one end of a lever 76 pivoted at 78 on the lower end of the shoe 12. Between the ends of the lever 76 it is pivotally connected as at 80 with another adjustable strut link 82 pivotally connected as at 84 with the shoe 14.

The cylinder 25 is formed with an inlet opening 86 to which there is connected a conduit 88 and through which fluid may pass from the cylinder 25ᵃ of the motor 18. The cylinder 25ᵃ is formed with an opening 90 to which the lower end of the conduit 88 is connected and the cylinder 25ᵃ is also provided with an inlet opening 92 to which a conduit 94 connected with a suitable source of liquid pressure is connected. The cylinder 25 is provided with a bleed opening 96 through which excess liquid and air may be forced when filling and bleeding the system.

In the arrangement shown in Figures 6 and 7 like parts are designated by the same numerals as used in Figures 1 to 5 inclusive with the addition of 100 and repeated description of these same parts is believed to be unnecessary. The cylinders of the motors 116 and 118 are designated 127 and 127ᵃ respectively and both cylinders have pistons 129 formed with interior threads within which threaded plugs 143 are screwed. These plugs may be screwed in or out to adjust the length of the connection between the pistons 129 and the shoes 112 and 114. Interposed between the pistons 126 and the shoes 114 are struts 137 providing a pivoted connection between the pistons 126 and the shoes 114, eliminating the sliding of the ends of the shoes on the piston, the consequent friction and the necessity of the wear plate. The cylinder 127 is provided with an inlet opening 193 to which a conduit 194 is connected whereby fluid under pressure may be supplied from a suitable source for actuating the motors 116 and 118. An outlet opening 191 is connected by a conduit 189 with an inlet opening 187 formed in the cylinder 127ᵃ. The cylinder 127ᵃ is also provided with a bleed opening 197.

Operation of the above described devices is substantially the same and it is believed that description of the first embodiment will be sufficient for both. In normal operation fluid is supplied under pressure through the conduit 94 by any suitable means and thus enters the cylinder 25ᵃ. Fluid flows under pressure from the cylinder 25ᵃ through the conduit 88 to the cylinder 25. Acting in both of the cylinders 25 and 25ᵃ, the fluid exerts pressure upon the pistons 26 and 28. On account of the springs 52 and 54 the forward ends of the shoes are maintained anchored while the ends of the shoes adjacent the anchors 20 and 22 are moved into contact with the rotating drum. Thereupon the drum is decelerated by the friction of the shoes, the shoes anchoring through the screws 42, the nuts 44, and the shoulders 38 upon the ends of the cylinders 25 and 25ᵃ. In the reverse direction of rotation of the drum, after contact with the drum, the ends of the shoes adjacent the anchors 22, move back until the pear-shaped openings 21 and 23 contact with the anchors 20 and 22, the shoes thus anchoring on said anchors.

When it is desired to apply the brake mechanically, tension exerted on the cable 60 pulls upon the lever 64 and through the toggle action of the lever 64 and the link 70 tends to spread the upper ends of the shoes which, as they come into contact wtih the rotating drum, act in the manner described above.

In filling the arrangement shown in Figures 1 to 5 inclusive the liquid being forced in through the conduit 94 and the opening 92 washes the included air upward through the conduit 88 and the air is then forced out through the bleed opening 96 which is at the highest point of both wheel cylinders. In bleeding the arrangement shown in Figures 6 and 7, the liquid is forced in at the low point of the cylinder 127 and moves out through the opening 191 at the high point of the cylinder, thus carrying with it all included air. The air and liquid are again forced in at the low point of the cylinder 127ᵃ and out at the high point of the cylinder 127ᵃ, thus washing out all of the included air.

It is to be understood that the above described embodiments of my invention are for the purpose of illustration only and various changes may be made therein without departing from the spirit and scope of the invention.

I claim:

1. A brake comprising a drum, a pair of shoes arranged within said drum and adapted to contact therewith, and each anchoring at one end when braking during one direction of rotation of the drum and on the other end when braking during the opposite direction of rotation of the drum, a pair of anchoring means on which said shoes anchor in one direction of rotation of the drum, and means for spreading said shoes into contact with the drum comprising a pair of levers and a cable connected to one of said levers for actuating both of said levers.

2. A brake comprising a drum, a pair of individually shiftable shoes positioned within said drum and on the other end when braking during therewith, and each anchoring at one end when braking during one direction of rotation of the drum and on the other end when braking during the opposite direction of rotation of the drum, anchoring means for said shoes, and means for spreading said shoes into contact with the drum comprising a pair of interengaging levers and applying means acting on one of said levers.

3. A brake comprising a drum, a pair of individually shiftable shoes positioned within said drum and arranged to be moved into contact therewith, and each anchoring at one end when braking during one direction of rotation of the drum and on the other end when braking during the opposite direction of rotation of the drum, anchoring means for said shoes, and means for spreading said shoes into contact with the drum comprising a pair of levers pivoted on one of said shoes.

4. A brake comprising a drum, a pair of individually shiftable shoes positioned within said drum and arranged to be moved into contact therewith, anchoring means for said shoes, and means for spreading said shoes into contact with the drum comprising a pair of levers pivoted at their opposite ends and acting on said shoes respectively, one of said levers having a cable connected thereto at its unpivoted end and being provided approximately at its center with a roller arranged to contact with the unpivoted end of the other said lever.

5. A brake comprising a drum, a pair of individually shiftable shoes positioned within said drum and arranged to be moved into contact therewith, anchoring means for said shoes, and means for spreading said shoes into contact with the drum comprising a pair of levers, a pair of strut links each pivotally connected to one of said levers and each at their opposite end connected to one of said shoes.

6. In a hydraulic braking system, a brake comprising a drum, friction means within said drum comprising a pair of shoes of substantially equal length each anchoring at one end when braking during one direction of rotation of the drum and on the other end when braking during the opposite direction of rotation of the drum, a pair of hydraulic actuating motors within said drum arranged to move said friction means into contact therewith, each positioned between opposite ends of the shoes diametrically opposite the other motors, and each provided with an outlet opening at the highest part of said motor, and an inlet opening at a lower part of said motor, the outlet of said lower motor being connected to the inlet opening of said higher motor.

7. In a hydraulic braking system, a brake comprising a drum, friction means within said drum comprising a pair of shoes of substantially equal length each anchoring at one end when braking during one direction of rotation of the drum and on the other end when braking during the opposite direction of rotation of the drum, a pair of hydraulic actuating motors within said drum arranged to move said friction means into contact therewith, each positioned between opposite ends of the shoes diametrically opposite the other motors, and each provided with an outlet opening at the highest part of said motor, and an inlet opening at a lower part of said motor, the outlet opening of said higher motor being connected to the inlet opening of said lower motor.

8. A hydraulic brake comprising a drum, a pair of individually shiftable shoes within said drum, a pair of fluid motors arranged to move said shoes into contact with said drum, means associated with each of said motors whereby one of said shoes anchors on each of said motors when braking while the drum is moving forward, and a strut link for each of said motors connecting the piston opposite to the end of the cylinder on which the shoes anchor during forward braking with the end of the other shoe.

9. A brake comprising a drum, a pair of shoes arranged within said drum and adapted to contact therewith, a pair of anchoring means on which said shoes anchor in one direction of rotation of the drum, and a plurality of means for spreading said shoes into contact with the drum, one of said means comprising a pair of levers and a cable connected to one of said levers for actuating both of said levers and the other said means comprising a pair of hydraulic actuating motors.

10. A brake comprising a drum, a pair of shoes arranged within said drum and adapted to contact therewith, a pair of anchoring means on which said shoes anchor in one direction of rotation of the drum, and a plurality of means for spreading said shoes into contact with the drum, one of said means comprising a pair of levers and a cable connected to one of said levers for actuating both of said levers and the other said means comprising a pair of hydraulic actuating motors within said drum arranged to move said shoes into contact therewith, each said motor being provided with an outlet opening at the highest part of said motor, and with an inlet opening at a lower part of said motor.

11. A brake comprising a drum, a pair of shoes arranged within said drum and adapted to contact therewith, a pair of anchoring means on which said shoes anchor in one direction of rotation of the drum, and a plurality of means for spreading said shoes into contact with the drum, one of said means comprising a pair of levers and a cable connected to one of said levers for actuating both of said levers and the other said means comprising a pair of hydraulic actuating motors within said drum arranged to move said friction means into contact therewith, each said motor being provided with an outlet opening at the highest part of said motor, and with an inlet opening at a lower part of said motor, the outlet of said lower motor being connected to the inlet opening of said higher motor.

12. A brake comprising a drum, a pair of shoes arranged within said drum and adapted to contact therewith, a pair of anchoring means on which said shoes anchor in one direction of rotation of the drum, and a plurality of means for spreading said shoes into contact with the drum, one of said means comprising a pair of levers and a cable connected to one of said levers for actuating both of said levers and the other of said means comprising a pair of hydraulic actuating motors within said drum arranged to move said shoes into contact therewith, each said motor being provided with an outlet opening at the highest part of said motor, and with an inlet opening at a lower part of said motor, the outlet opening of said higher motor being connected to the inlet opening of said lower motor.

13. A brake comprising a drum, a pair of shoes arranged within said drum and adapted to contact therewith, a pair of anchoring means on which said shoes anchor in one direction of rotation of the drum, and a plurality of means for spreading said shoes into contact with the drum, one of said means comprising a mechanical actuating means and the other said means comprising a pair of hydraulic actuating motors each having a pair of pistons acting on the shoes respectively and one of which serves as an anchor for one of the shoes in the other direction of rotation of the drum.

14. A brake comprising a drum, a pair of shoes arranged within said drum and adapted to contact therewith, a pair of anchoring means on which said shoes anchor in one direction of rotation of the drum, and a plurality of means for spreading said shoes into contact with the drum, one of said means comprising a mechanical actuating means and the other said means comprising a pair of hydraulic actuating motors within said drum arranged to move said shoes into contact therewith, each said motor being provided with an outlet opening at the highest part of said motor, and with an inlet opening at a lower part of said motor.

15. A brake comprising a drum, a pair of shoes arranged within said drum and adapted to contact therewith, a pair of anchoring means on which said shoes anchor in one direction of rotation of the drum, and a plurality of means for spreading said shoes into contact with the drum, one of said means comprising a mechanical actuating means and the other said means comprising a pair of hydraulic actuating motors within said drum arranged to move said friction means into contact therewith each said motor being provided with an outlet opening at the highest part of said motor, and with an inlet opening at a lower part of said motor, the outlet of said lower motor being connected to the inlet opening of said higher motor.

16. A brake comprising a drum, a pair of shoes arranged within said drum and adapted to contact therewith, a pair of anchoring means on which said shoes anchor in one direction of rotation of the drum, and a plurality of means for spreading said shoes into contact with the drum, one of said means comprising a mechanical actuating means and the other said means comprising a pair of hydraulic actuating motors within said drum arranged to move said shoes into contact therewith each said motor being provided with an outlet opening at the highest part of said motor, and with an inlet opening at a lower part of said motor, the outlet opening of said higher motor being connected to the inlet opening of said lower motor.

17. A brake comprising a drum, a pair of individually shiftable shoes within said drum, a pair of anchoring means on which said shoes anchor in one direction of rotation of the drum, a pair of fluid motors arranged to move said shoes into contact with said drum, means associated with each of said motors whereby one of said shoes anchors on each of said motors when braking in the opposite direction of rotation of the drum, a strut link for each of said motors connecting the piston opposite to the end of the cylinder on which the shoes anchor in said opposite direction of rotation with the end of the other shoe, and mechanical means for spreading said shoes into contact with the drum, said strut links being adjustable to compensate for wear of the shoes.

18. A brake comprising a drum, a pair of individually shiftable shoes within said drum, a pair of anchoring means on which said shoes anchor in one direction of rotation of the drum, a pair of fluid motors arranged to move said shoes into contact with said drum, means associated with each of said motors whereby one of said shoes anchors on each of said motors when braking in the opposite direction of rotation of the drum, a strut link for each of said motors connecting the piston opposite to the end of the cylinder on which the shoes anchor in said opposite direction of rotation with the end of the other shoe, and mechanical means for spreading said shoes into contact with the drum comprising a pair of levers and a cable connected to one of said levers for actuating both of said levers.

LUDGER E. LA BRIE.

CERTIFICATE OF CORRECTION.

Patent No. 2,144,025.　　　　　　　　　　　　　　　　January 17, 1939.

LUDGER E. LA BRIE.

It is hereby certified that error appears in the printed specification of the above numbered patent requiring correction as follows: Page 2, second column, line 73, claim 2, strike out the words "on the other end when braking during" and insert instead arranged to be moved into contact; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.